(No Model.) 3 Sheets—Sheet 1.

M. T. MURPHY & G. J. H. JACQUES.
REINFORCING THREAD MECHANISM FOR KNITTING MACHINES.

No. 583,653. Patented June 1, 1897.

Witnesses.
Edward F. Allen
Thomas J. Drummond

Inventors.
Michael T. Murphy.
George J. H. Jacques.
By Crosby & Gregory,
Attys.

THE NORRIS PETERS CO., PHOTO-LITHO., WASHINGTON, D. C.

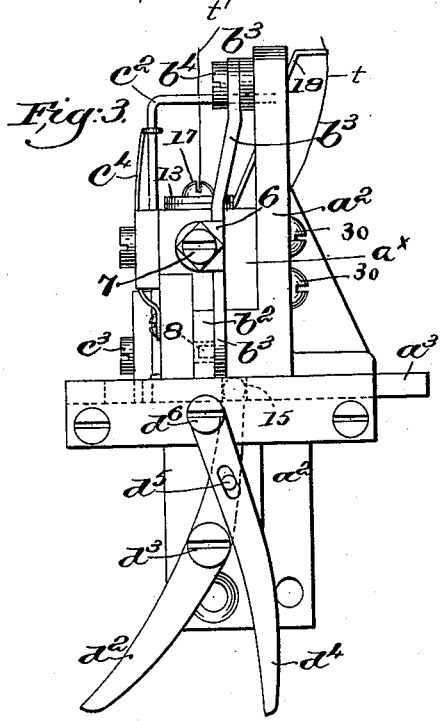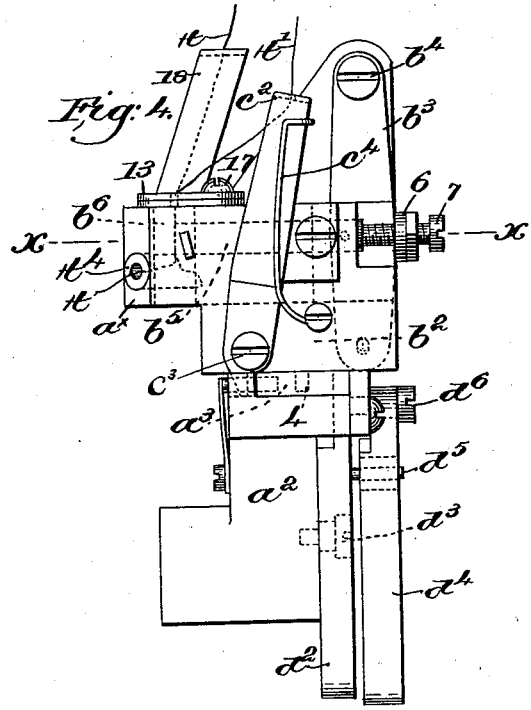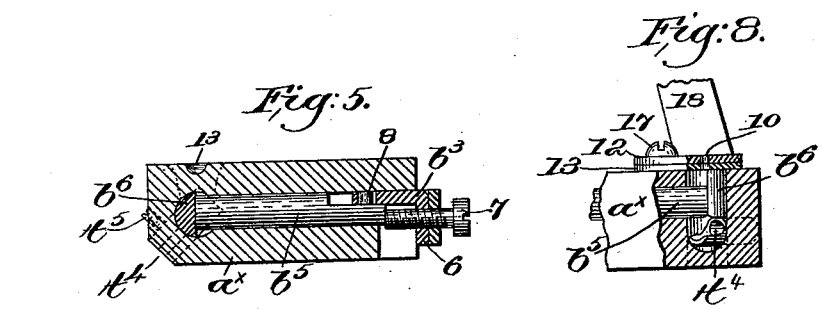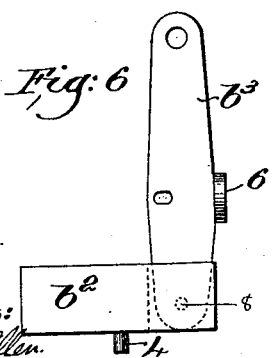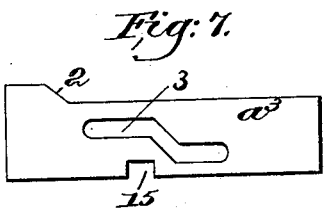

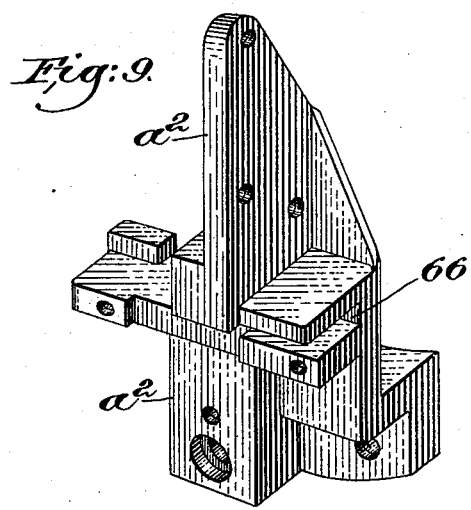
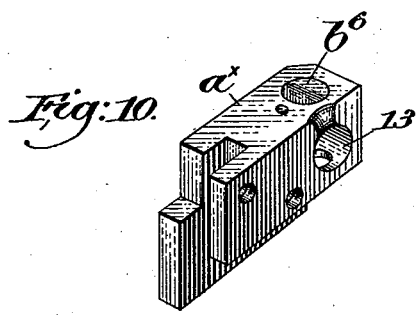

UNITED STATES PATENT OFFICE.

MICHAEL T. MURPHY AND GEORGE J. H. JACQUES, OF PAWTUCKET, RHODE ISLAND.

REINFORCING-THREAD MECHANISM FOR KNITTING-MACHINES.

SPECIFICATION forming part of Letters Patent No. 583,653, dated June 1, 1897.

Application filed July 15, 1896. Serial No. 599,226. (No model.)

*To all whom it may concern:*

Be it known that we, MICHAEL T. MURPHY and GEORGE J. H. JACQUES, of Pawtucket, county of Providence, State of Rhode Island, have invented an Improvement in Knitting-Machines, of which the following description, in connection with the accompanying drawings, is a specification, like letters and figures on the drawings representing like parts.

This invention in knitting-machines has for its object the production of novel mechanical devices whereby a reinforcing-thread may be put into a fabric being knitted at any desired portion, and we have shown our invention as applied to a rib-knitting machine using cylinder and dial needles.

In our invention we may insert a reinforcing-thread into any part of the leg or foot of a stocking, and for any desired length of each course and for any desired number of courses.

Figure 1:
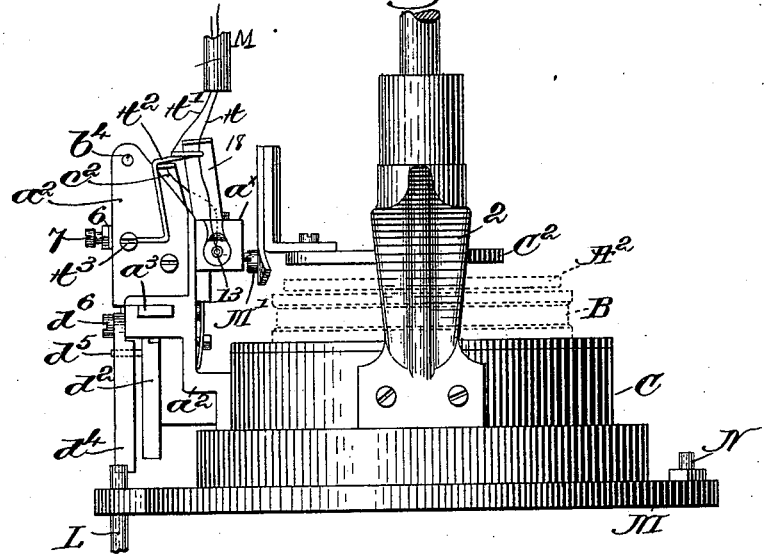
Figure 2:
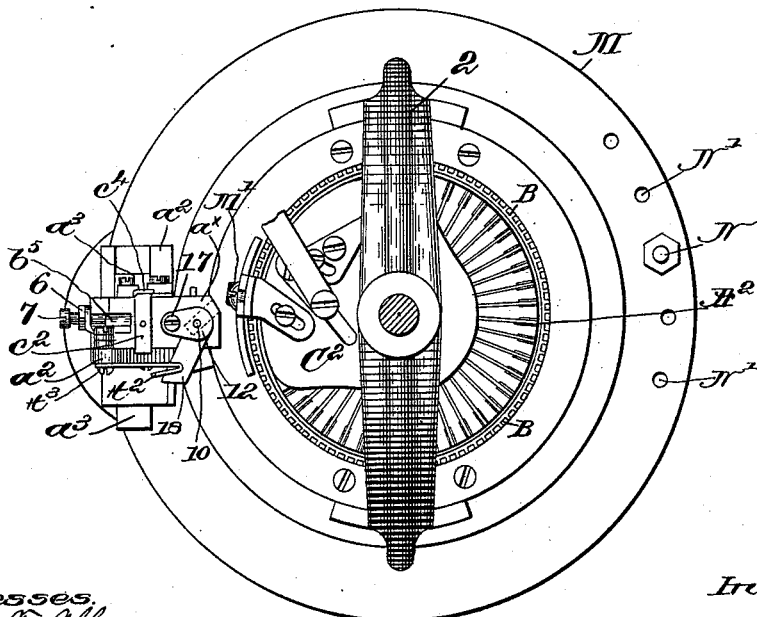

Figure 1, in side elevation, shows a sufficient portion of a rib-knitting machine of usual construction with which we have embodied our invention; Fig. 2, a top or plan view of Fig. 1; Fig. 3, an enlarged detail of our improvements detached; Fig. 4, a side elevation of the apparatus shown in Fig. 3; Fig. 5, a section in the line $x$, Fig. 4; Fig. 6, a detail of parts to be hereinafter referred to. Fig. 7 shows the cam-slide detached; Fig. 8, a detail showing the thread-guide block. Fig. 9 shows the stand $a^2$ by itself, and Fig. 10 shows the thread-guide block $a^\times$ detached and in perspective.

The bed M, cam-cylinder C, needle-cylinder B (shown by dotted lines) to contain the cylinder-needles, the dial-plate $A^2$ to hold the dial-needles, the dial cam-plate $C^2$ to actuate the dial-needles, the yoke 2 connecting the cam-cylinder and dial cam-plate, and the two pins L, raised at times to project up through the bed M, the time of their movement depending on the requirements of a pattern surface or chain, are and may be all as common in well-known knitting-machines, the particular devices so far referred to being found in United States Patent No. 292,490, dated January 29, 1884.

The cam-cylinder and dial cam-plate will be provided with suitable cams to reciprocate the needles in usual manner.

M represents a stationary thread-guide supported in any usual manner above the needles of the machine.

Upon the cam-cylinder we have erected a stand $a^2$, the shape of which is fully shown in Fig. 9, where the said stand is shown by itself, which has a guideway 66, in which is placed a cam-slide $a^3$, (shown detached in Fig. 7,) it having a cam 2 at one edge, and a cam-slot 3 to receive a pin 4 extended from a bar $b^2$, located above and at right angles to the said cam-slide and free to be slid by said pin and cam-groove in a suitable guideway connected to or forming part of said stand, the said bar having pin-jointed to it at 8 a clamp-lever $b^3$, mounted on a stud $b^4$, and having, as shown, an ear 6, in which is mounted an adjustable contact-point, (shown as a screw 7,) said point meeting the end of and moving a clamp $b^5$, fitted to be slid in a passage in a thread-guide block $a^\times$, bored and provided with a hole substantially central for the reception of a sliding clamp $b^5$, said block being connected to the said stand by suitable screws 30, the reinforcing-thread $t'$ passing between the end of said clamp and a leather-board or other suitable friction-block or piece $b^6$, the said thread being led from the usual thread-guide M through a hole in a slack-controlling lever $c^2$, pivoted at $c^3$, and having its lower end (see Fig. 4) extended far enough to be acted upon by the cam 2, a suitable spring $c^4$ acting on the said lever and normally keeping its lower end pressed toward the edge of the said cam-slide.

After passing through the eye in the lever $c^2$ the reinforcing-thread enters a hole 10 in a small plate 12, which covers the hole in which is located the friction block or piece $b^6$, the said thread $t'$ being led from said hole down between said friction-block and the end of the clamp.

The thread-guide block $a^\times$ has a hole 13 in its side in which is entered the main thread $t$, it coming from the said thread-guide M through an eye in a wire guide $t^2$, fastened to the stand $a^2$ by a suitable screw $t^3$, the said thread entering a hole 13 in a guide-eye $t^4$, held in said block $a^\times$ by a set-screw $t^5$, the said thread $t$, as it runs through said hole 13 and into said guide-eye to pass out to the needles, traveling past the lower end of the friction-piece $b^6$, so that whenever the clamp $b^5$ is retracted to unclamp or release the reinforcing-thread $t'$ the free end of the latter, then in contact with the running main thread $t$, will be picked up by the said main thread and taken to the needles to reinforce the fabric by the use of both threads.

When it is desired to omit the reinforcing-thread from the fabric, it is only necessary to cause the cam-plate $a^3$ to be moved to the right, viewing Fig. 3, and cause the cam 3, it acting on pin 4, to move the slide-bar $b^2$ and lever $b^3$ and cause the screw 7, carried by said lever, to act on and push the clamp firmly against the reinforcing-thread, the said clamp sliding longitudinally in the hole bored for its reception in said thread-guide block, and immediately thereafter the said thread in the rotation of the cam-cylinder is parted below the end of the clamp.

The cam-slide has a notch 15, (see Fig. 7,) in which is entered the upper end of a lever $d^2$, pivoted at $d^3$ on a part of the stand, said lever being connected to a second lever $d^4$, pivoted at $d^6$, by a pin-and-slot connection $d^5$, so that when either lever is moved it moves the other in the opposite direction to move the cam-slide and cause it to move the clamp and lever $c^2$ positively.

The screw 17, holding the cover 12, also holds a thread-rest 18, having a foot with a hole coinciding with the hole in the cover, the upper end of the rest receiving against it the main thread, said finger producing some tension on the said thread.

The slack-thread lever is moved to the right, as shown in Fig. 4, just after the clamp engages and holds the reinforcing-thread, and in such movement it pulls from the thread-guide M a certain quantity of thread, and just before the clamp is to be opened the cam-slide is moved to the left in Fig. 3, which enables the spring $c^4$ to move said lever $c^2$ to the left, Fig. 4, until the hole in it is substantially over the hole in the said cover, such movement of the said lever giving up the slack previously pulled off, and then the clamp is opened, letting the running thread take the reinforcing-thread with it by friction.

The rod L will in practice be raised and lowered by a pattern-chain, as provided for in said patent, and when it is desired to put in the reinforcing-thread the said pin is raised to meet and move the lever $d^4$, and the feeding of the said reinforcing-thread into the fabric may be omitted at any desired point by moving the lever $d^2$.

To move the lever $d^2$, we have mounted in the bed M a stud N, and it may be placed in any one of a number of holes N' to act sooner or later on the said lever, and thus cause the said reinforcing-thread to appear course after course in a greater or less portion of the knitted fabric, whether at the knee, the front or back of the leg, the top or bottom of the foot, or the heel or toe, all this being determined by adjustments of the rod and pin.

To avoid confusion in the drawings, we have omitted the needles, they being arranged as usual for rib-knitting.

The dial-plate $C^2$ has connected to it in usual manner a thread-guide M, which supplies the thread to the needles.

Having described our invention, what we claim, and desire to secure by Letters Patent, is—

1. In a knitting-machine, the combination with a thread-guide block bored longitudinally and having a guideway for a main thread, and a passage intersecting the bore and guideway for the reception of a reinforcing-thread, combined with a clamping-rod placed in the said thread-guide block, and means to move said clamp and cause it to act upon and stop the said reinforcing-thread, or release the said reinforcing-thread and permit it to be taken up by the main thread, substantially as described.

2. A thread-guide block having a passage to present a reinforcing-thread, a slackening-lever to act on said thread and draw it from a guide and to thereafter give up said thread, combined with a sliding clamp, a cam-slide having a cam-slot 3, a slide-bar moved by said cam-slide, and means intermediate said slide-bar and clamp to move the latter, to operate, substantially as described.

3. A thread-guide block having a passage to present a reinforcing-thread, a slackening-lever to act on said thread and draw it from a guide and to thereafter give up said thread, combined with a sliding clamp, a cam-slide having a cam-slot 3, a slide-bar moved by said cam-slide, and means intermediate said slide-bar and clamp to move the latter, two levers operatively connected with said cam-slide to move it positively first in one and then in an opposite direction, and means to operate said levers at desired times according to the number of needles in any knitted course which it is desired shall receive the said reinforcing-thread, substantially as described.

4. In a knitting-machine, a cam-cylinder, a stand attached thereto, and having a guideway; a cam-slide placed therein and provided with a cam-slot, a cam-edge, and a notch; a slide-bar having a pin entering the cam-slot of said slide, a lever connected at one end with said slide-bar; a sliding clamp operated by the movement of said lever; a thread-guide block bored longitudinally for the reception of said clamp, said block having a hole for the reception of a main thread and for the passage of a reinforcing-thread; and a slackening-lever $c^2$ having one end shaped to be acted upon by the cam edge of said cam-slide; combined with a pivoted lever having one end fitted to the notch of the said cam-slide, and a second pivoted lever having a slot engaging a pin of the lever the end of which fits the said notch, and means to move both said levers, whereby the cam-slide moves positively, substantially as and for the purposes set forth.

In testimony whereof we have signed our names to this specification in the presence of two subscribing witnesses.

MICHAEL T. MURPHY.
GEORGE J. H. JACQUES.

Witnesses:
HENRY H. SHELDON,
D. D. MURPHY.